United States Patent
Franke et al.

[11] Patent Number: 5,847,358
[45] Date of Patent: *Dec. 8, 1998

[54] METHOD AND APPARATUS FOR REMOVING MATERIAL FROM METAL WORKPIECES MOVED RELATIVE TO A LASER REMOVAL TOOL

[75] Inventors: Jörg Franke, Herzogenrath; Wolfgang Schulz, Langerwehe; Gerd Herziger, Roetgen-Rott, all of Germany

[73] Assignees: Advanced Technik GmbH, Steinenbronn; Fraunhofer-Gesellschaft zur Förderung der Angewandten Forschung E.V., München, both of Germany

[ * ] Notice: The term of this patent shall not extend beyond the expiration date of Pat. No. 5,651,904.

[21] Appl. No.: 672,871

[22] Filed: Jun. 28, 1996

Related U.S. Application Data

[63] Continuation of Ser. No. 240,661, filed as PCT/DE92/00950 Nov. 19, 1992, Pat. No. 5,651,904.

[30] Foreign Application Priority Data

Nov. 19, 1991 [DE] Germany ............... 41 38 075.4
May 12, 1992 [DE] Germany ............... 42 15 561.4

[51] Int. Cl.⁶ ............... B23K 26/06; B23K 26/14
[52] U.S. Cl. ............... 219/121.67; 219/121.72; 219/121.73; 219/121.75; 219/121.84
[58] Field of Search ............... 219/121.67, 121.72, 219/121.73, 121.76, 121.77, 121.84, 121.61, 121.75, 121.74

[56] References Cited

U.S. PATENT DOCUMENTS

| | | |
|---|---|---|
| 3,597,578 | 8/1971 | Sullivan et al. . |
| 3,604,890 | 9/1971 | Mullaney . |
| 3,965,328 | 6/1976 | Locke . |
| 4,084,988 | 4/1978 | Engel et al. . |
| 4,724,297 | 2/1988 | Nielsen . |
| 4,952,770 | 8/1990 | Hayashi . |
| 5,651,904 | 7/1997 | Franke et al. ............. 219/121.72 |

FOREIGN PATENT DOCUMENTS

| | | |
|---|---|---|
| 0458182A2 | 11/1991 | European Pat. Off. . |
| 1814375 | 11/1970 | Germany . |
| 59-87995 | 5/1984 | Japan . |
| 59-87996 | 5/1984 | Japan . |
| 59-104289 | 6/1984 | Japan . |
| 1-53794 | 3/1989 | Japan . |
| 1-180793 | 7/1989 | Japan . |

*Primary Examiner*—Gregory L. Mills
*Attorney, Agent, or Firm*—Wigman, Cohen, Leitner & Myers, P.C.

[57] ABSTRACT

A method is disclosed for removing material from moving metal workpieces, in particular for cutting sheet metal. It entails preheating, without melting, the surface of the workpiece to a temperature at which ignition is triggered by a combustible gas directed onto the preheated section as a jet under pressure, while burnt material from the workpiece is blown away from the cut recess thus produced. In order to achieve smooth edges on large-gauge workpieces with a relatively high feed-rate, a laser beam is also directed onto the cutting front in the cut recess.

16 Claims, 6 Drawing Sheets

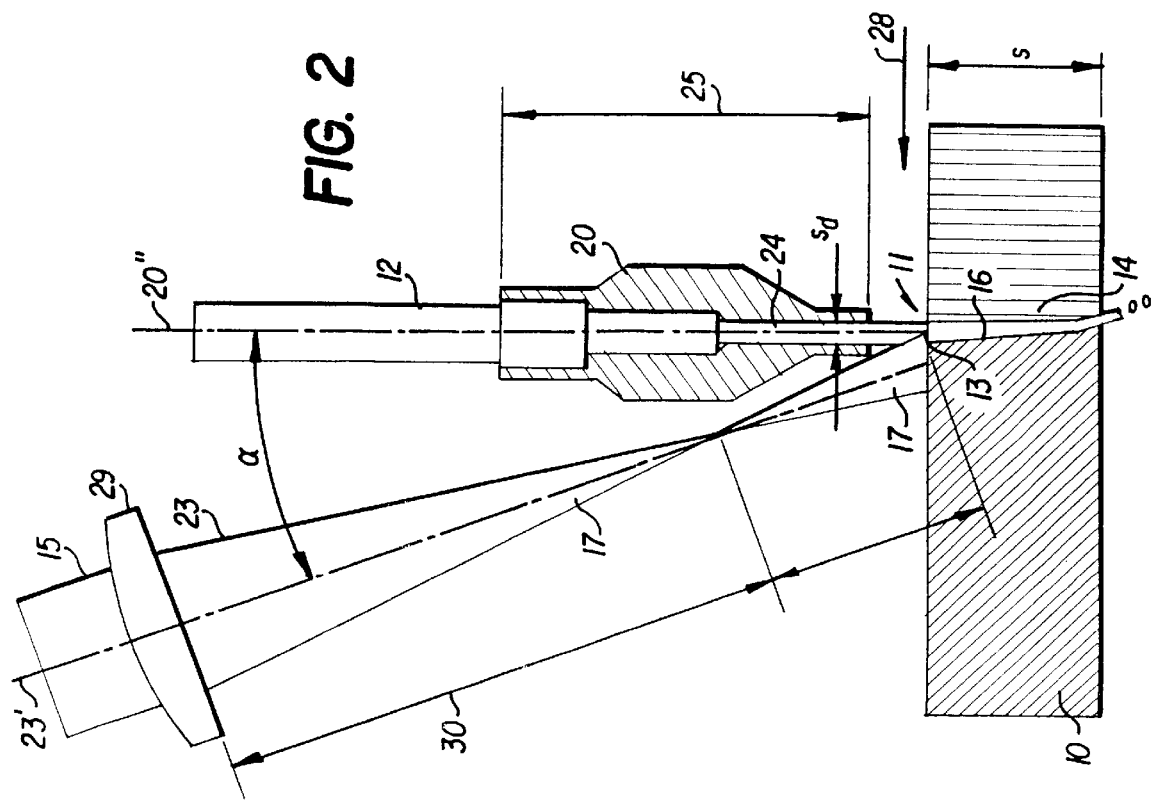
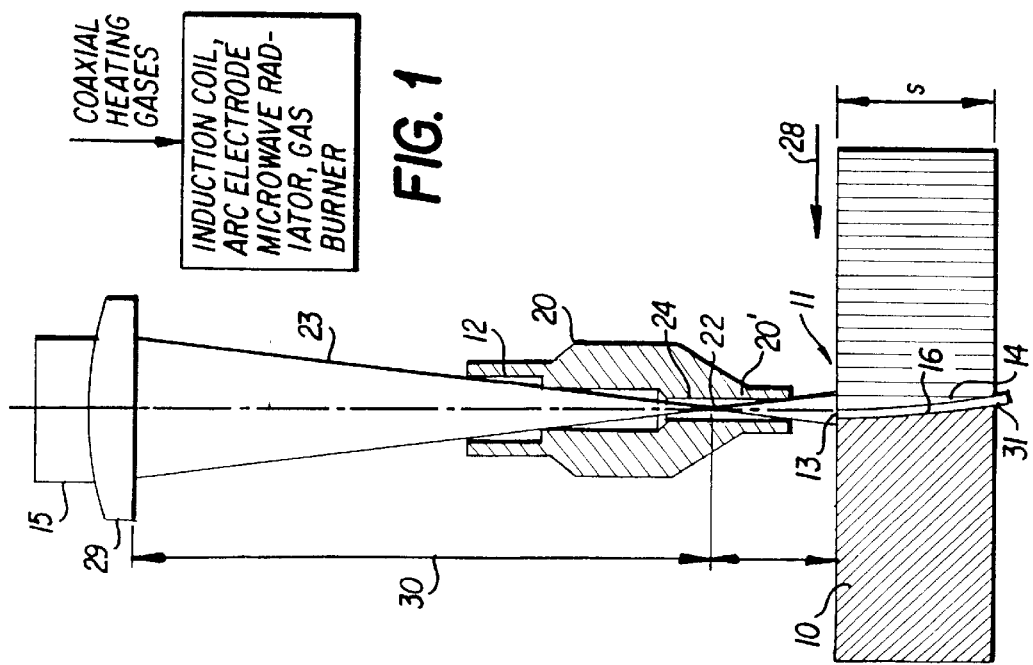

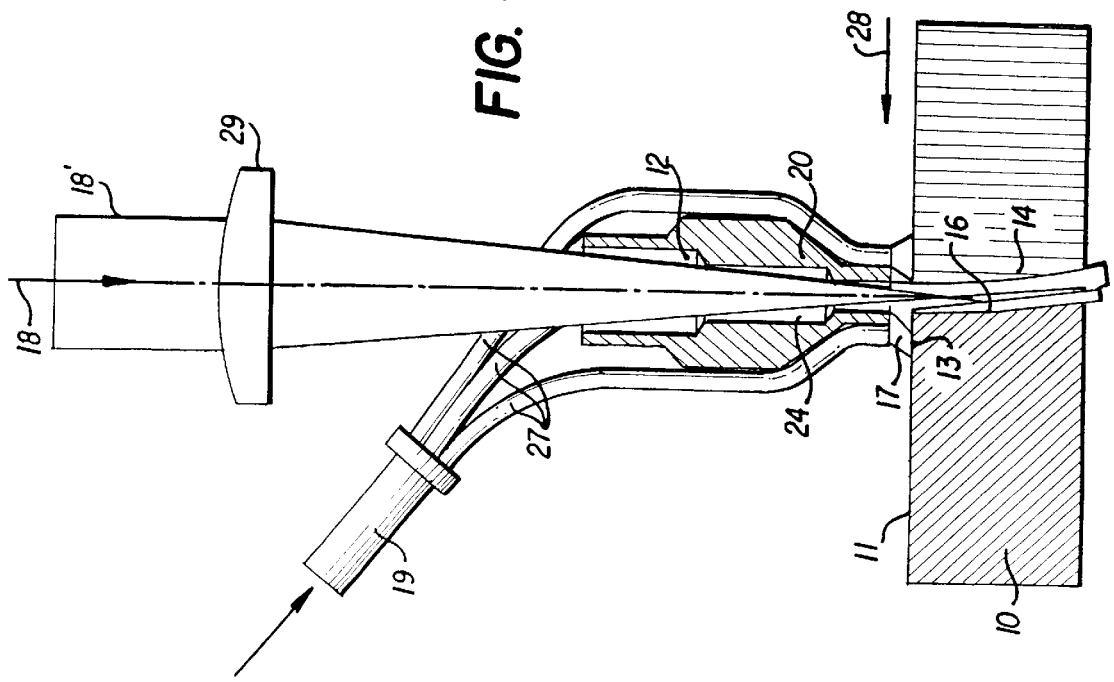
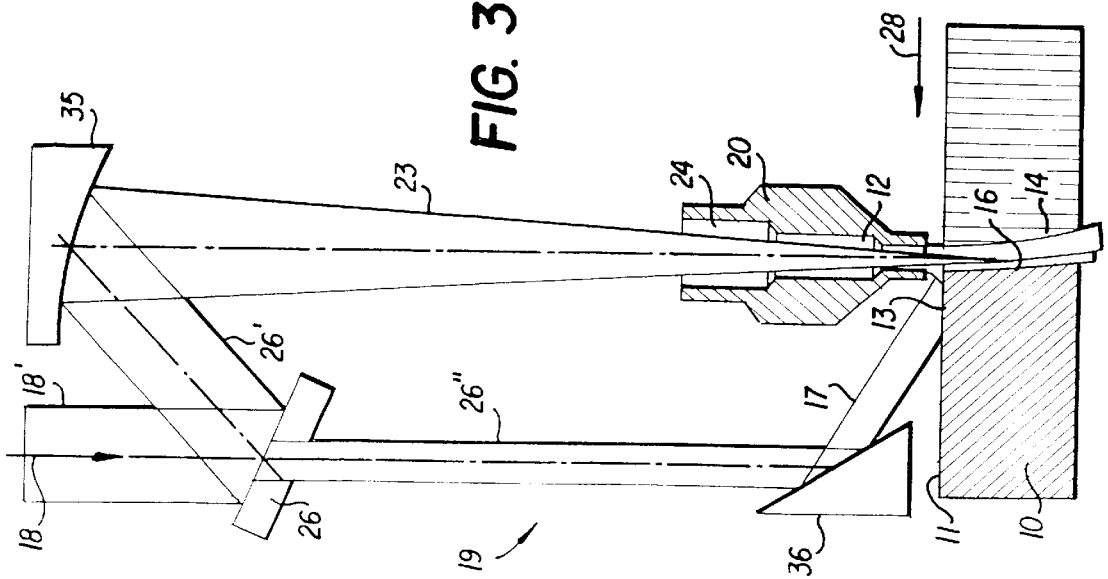

METHOD AND APPARATUS FOR REMOVING MATERIAL FROM METAL WORKPIECES MOVED RELATIVE TO A LASER REMOVAL TOOL

This is a continuation of application Ser. No. 08/240,661, filed as PCT/DE92/00950 Nov. 19, 1992, now U.S. Pat. No. 5,651,904.

BACKGROUND OF THE INVENTION

Field of the Invention

The present invention refers to a method for removing material from metal workpieces moved relative to the removal tool, in particular for cutting sheet metal, comprising the step of preheating, without melting, the surface of the workpiece to a temperature at which ignition is triggered by a combustible gas which is blown onto the preheated section as a jet under pressure and by means of which burnt material of the workpiece is blown away from a cut recess produced by such burning.

Such a method is used in autogenous gas cutting processes. The preheating of the surface of the workpiece to the ignition temperature of said workpiece is carried out by means of a heating gas, e.g. a gas mixture consisting of acetylene and oxygen. The melting point is not reached during this preheating process. It is regarded as being essential that energy of the heating gas also penetrates into the kerf. The combustible gas used is oxygen by means of which the material of the workpiece is burnt to oxide. The oxide is blown away by the pressure of the combustible gas. A kerf or a cut recess having smooth walls is produced.

In the generally known laser beam gas cutting process, a jet of combustible gas and a laser beam which is coaxial with said gas jet are used for cutting sheet metal. When this laser beam gas cutting process is used for sheet metal thicknesses of less than 20 mm, the cutting speed can be increased in comparison with conventional autogenous gas cutting processes. The quality of cut faces of thicker plates, however, will be less good. When plates having a thickness of approx. 10 mm and higher are cut, the number of burnt-out cavities will increase and the averaged peak-to-valley heights will frequently exceed 100 μm. Burnt-out cavities and surface roughnesses originate from turbulences caused on the removal front due to the incident laser radiation during melting and burning. The turbulences occurring will also reduce the cutting speed.

SUMMARY AND OBJECTS OF THE INVENTION

Hence, it is the object of the present invention to improve a method having the features mentioned at the beginning in such a way that also thick workpieces, i.e. steel plates having a thickness of more than 30 mm, can be subjected to a rapid material-removing process which will produce surfaces of the walls of the cut recess having a peak-to-valley height of less than 50 μm.

This object is achieved by the feature that, in addition to the combustible gas, also laser radiation is irradiated into the cut recess where it impinges on the removal front.

The above-mentioned method step is known in connection with conventional laser beam gas cutting processes, but in these conventional processes it results in an increase of the peak-to-valley heights and in a reduction of the cutting speed with increasing plate thicknesses. The present invention, however, makes use of the important finding that, in the case of thick plates, an increase in the peak-to-valley height and a reduction of the cutting speed can be avoided when the surface of the cutting region is preheated before the laser radiation impinges on the removal front. Only then will it be possible to expect troublefree burning when the cutting process is started from the workpiece surface, such troublefree burning being known from autogenous gas cutting processes. In the case of the present method, the laser radiation irradiated onto the removal front serves to additionally couple thermal energy into the cut recess for increasing thus the cutting speed without causing any turbulences in the course of the melting processes. It follows that the laser radiation can especially produce an effect which will heat and straighten the removal front flattening at the lower cutting edge. If, however, no preheating is carried out, instabilities will occur, which originate from the first cut or rather from the points where the cutting operation is started, said instabilities being caused e.g. by variations in the introduction of the radiation energy due to varying reflection conditions.

The result obtained is a burn-off stabilized laser beam gas cutting process. Plates having a thickness of more than 30 mm will have smooth cut faces having preferably peak-to-valley heights of $R_z<50$ μm. The cuts are free from burrs, and if any burrs should actually occur they can easily be removed. The cutting speed is increased and it is also possible to cut very thick plates, e.g. 80 mm. Due to the burn-off stabilized burning of the material, an exothermic reaction is obtained which is stable with respect to time; in said exothermic reaction an optimum energy exploitation of the combustible gas takes place and the energy of the laser radiation is coupled into the removal front in the best possible way. The ratio of the removal efficiency of the combustible gas to the removal efficiency of the laser radiation is many times larger than in the case of known laser beam gas cutting processes, and this makes immediately evident that these known processes have been improved.

It will be expedient to preheat the preheating section with laser radiation. The preheating by means of laser radiation offers the advantage that the method can be used universally and that it can be adapted to the respective cutting case. Such preheating offers in particular the possibility of using laser radiation of the same laser radiation source for preheating the workpiece and for irradiation into the cut recess. In this connection, it will be advantageous to use one laser beam. It is, however, just as well possible to use two laser beams which are guided separately from each other. Hence, only a single laser will be necessary, just as in known laser beam gas cutting processes.

It will be advantageous to carry out the method in such a way that the temperature of the preheating section is controlled such that it is adjusted to at least the ignition temperature of the material. A control of the temperature in the preheating section can be used for guaranteeing that the temperature does not fall below the ignition temperature in said preheating section during the cutting operation, and it can be used for guaranteeing that the melting temperature is not reached. The control will especially be necessary in cases in which the workpiece surface shows, e.g. due to oxidation, different ignition behaviours from one preheating section to the next. The control will especially offer advantages in connection with preheating processes by means of laser radiation, if the workpiece surface shows different absorption behaviours with respect to the laser radiation. The measure of maintaining the temperature of the preheating section constant will especially permit optimum cutting of workpieces in the case of which little difference exists between the ignition temperature and the melting temperature.

The method can also be carried out such that induction coils and/or arc electrodes and/or microwave radiators and/or gas burners are used for the purpose of preheating. In this case, conventional heating means are used whose special advantages can be utilized purposefully. The method is, by way of example, carried out in such a way that, for the purpose of preheating with a heating gas, a gas burner provided with an annular nozzle is used, the heating waste gases of said annular nozzle flowing off coaxially with the combustible gas. The heating gases flowing off coaxially with the combustible gas support the combustible gas jet, which, consequently, impinges on the workpiece with a very small or rather unexpanded diameter so that the cut recess can be kept small; this is an advantage with respect to plate cutting processes. Just as in the case of known autogenous gas cutting processes, a high percentage of the heating energy penetrates into the cut recess, where it will be available for participating in the melting process.

It will be advantageous to carry out the method in such a way that the laser radiation irradiated into the cut recess is irradiated in the form of pulses. When the laser radiation is irradiated in the form of pulses, the power coupled in can be influenced. An influence on the pulses permits not only a control of the removal rate but also an influence on local melting and burning processes and, consequently, an influence on the surface quality of the cut walls and on the peak-to-valley height thereof.

The measure of protecting the preheating section against burning off turned out to be very important. Such burning off may be caused by combustible gas escaping at the side of the cut recess, or by reaction with the surrounding atmosphere. This protection can be achieved by flushing the preheating section with a gas protecting said preheating section against a premature reaction with another gas and/or by admixing a non-reactive gas to the combustible gas. The admixture of the non-reactive gas has to be carried out such that the necessary removal efficiency still essentially originates from the exothermic reaction of the material of the workpiece with the combustible gas, a premature reaction at the side of the cut recess being no longer possible. The non-reactive gas, however, still participates in the expelling and the blowing away of the burnt material of the workpiece. The gases which may be used as non-reactive gases are inert or reductive cold or hot gases, e.g. nitrogen. The flushing of the preheating section with a gas protecting said preheating section against a premature reaction can also be achieved by a heating gas of a preheating annular nozzle which flows off coaxially with the combustible gas; in this case, attention wwill have to be paid to the fact that the combustible gas jet should not be deflected or contaminated by the jet of protective gas or heating waste gas.

In the case of very thick plates having a thickness of e.g. >100 mm, it may be advantageous to carry out the method in such a way that the laser radiation irradiated into the cut recess in addition to the combustible gas is adapted to be reduced and/or switched off. For the purpose of preheating, it will still be advantageous to use laser radiation.

The present invention additionally refers to an apparatus for removing material from metal workpieces moved relative to the removal tool, in particular for cutting sheet metal, said apparatus comprising means for preheating the surface of the workpiece to a temperature below the melting temperature at which ignition is triggered by a combustible gas, and further comprising a nozzle for the combustible gas used for blowing said combustible gas under pressure onto the preheated section. In order to construct such an apparatus along the lines of the statement of task mentioned hereinbefore, said apparatus is constructed such that a laser is provided, which, in addition to the combustible gas, impinges on the removal front of a cut recess.

It will be advantageous to construct the apparatus in such a way that the focus of the laser beam is arranged above the workpiece. It turned out that such an arrangement of the focus will help to increase the cutting speed. Moreover, the component of the laser beam which laterally irradiates the workpiece adjacent the cut recess can be used for the purpose of preheating. In this case, the preheating section produced by the laser beam will be larger than the area in which the combustible gas jet impinges on the workpiece. A single laser beam suffices to guarantee that the combustible gas jet will always impinge on preheated material and that also the cutting speed will be increased by laser radiation irradiated into the cut recess.

The apparatus will be simplified in an area close to the workpiece when the laser beam passes through the nozzle for the combustible gas. It is thus guaranteed that, due to the fact that the laser beam is arranged coaxially with the combustible gas jet, it will always impinge on a predetermined location of the removal front, especially also in cases in which different plate thicknesses are dealt with. The apparatus can be constructed such that the nozzle for the combustible gas is a gas cutting nozzle tapering in steps towards the workpiece, and that the focus of the laser beam is arranged in the narrowest nozzle step. The stepped configuration of the nozzle for the combustible gas is, on the one hand, provided for shaping the combustible gas jet and, on the other hand, it serves to effect an adaptation to the cross-sections varying over the length of the laser beam. The arrangement of the focus of the laser beam in the narrowest nozzle step has especially the effect that the hole of the nozzle can be restricted to the smallest possible size, and this is important with respect to a large length of throw of the nozzle for the gas jet.

The apparatus is constructed such that the smallest nozzle diameter is smaller than the preheating section so that the diameter of the combustible gas jet can be kept as small as possible and so that said diameter of the combustible gas jet will exclusively determine the width of the cut recess.

Good bundling of the combustible gas jet will be achieved when the the nozzle for the combustible gas is provided with a slim hole with a ratio of hole length to hole diameter of at least 8:1.

In order to permit the removal effect of the apparatus to be adapted to different plate thicknesses, the apparatus is constructed such that its nozzle diameter is dimensioned as follows:

$$\log\left[\frac{s_d}{[mm]}\right] = 6 \cdot \frac{s}{[mm]} + b$$

$s_d$=nozzle diameter
s=thickness of the steel plate
b=empirical value (−0.4<b<0.1).

The apparatus may also be constructed such that a laser beam used for preheating the preheating section is arranged such that it runs ahead of the nozzle and that it extends at an acute angle relative to the longitudinal axis of said nozzle. Such a structural design will be advantageous especially in cases in which little laser radiation or, temporarily, no laser radiation at all is to be irradiated onto the removal front of very thick plates, or if, in addition to a laser beam which is coaxial with the combustible gas, a preheating is to be achieved which is independent of said coaxial laser beam.

The arrangement of the laser beam at an oblique angle is especially adapted to an exterior structural design of the combustible gas nozzle tapering towards the workpiece. The preheating spot which is formed on the preheating section of the workpiece by means of a laser beam having a circular cross-section is elliptical. Due to this longitudinal extension, an adequately high percentage is irradiated into the cut recess and, in spite of the oblique position, also onto the removal front, especially when said removal front becomes increasingly shallower in the case of larger removal depths.

In the case of one advantageous structural design of the apparatus, laser radiation is irradiated onto the removal front and laser radiation is also used for carrying out preheating, this being achieved by two separately guided beams. In order to achieve this, the apparatus is constructed such that a laser radiation source is provided, the laser radiation of said laser radiation source being supplied to a beam splitter, and that a first component of the radiation reflected by said beam splitter is adapted to be directed onto the removal front coaxially with the combustible gas whereas a second component is adapted to be directed onto the preheating section. The laser radiation source can be a single laser for the whole apparatus.

In order to be able to guide laser radiation into the cut recess and and onto the desired locations in the area around the cut recess in a flexible manner, the apparatus is constructed such that the laser radiation is transmitted by optical fibres. The flexile arrangement and provision of the optical fibres offers also the possibility of carrying out reheating or of guiding laser radiation to specific individual points of the removal front.

BRIEF DESCRIPTION OF THE DRAWINGS

The present invention is explained on the basis of embodiments shown in the drawing in which:

FIG. 1 shows a vertical section through a removal device in a schematic representation, FIG. 2 shows a representation which is similar to that of FIG. 1 and in which the laser beam runs ahead so as to produce a larger preheating section, FIGS. 3,4 shows devices used for preheating by means of laser radiation and for simultaneously irradiating laser radiation onto the working front.

DETAILED DESCRIPTION OF THE PREFERRED EMBODIMENTS

Figure 5:
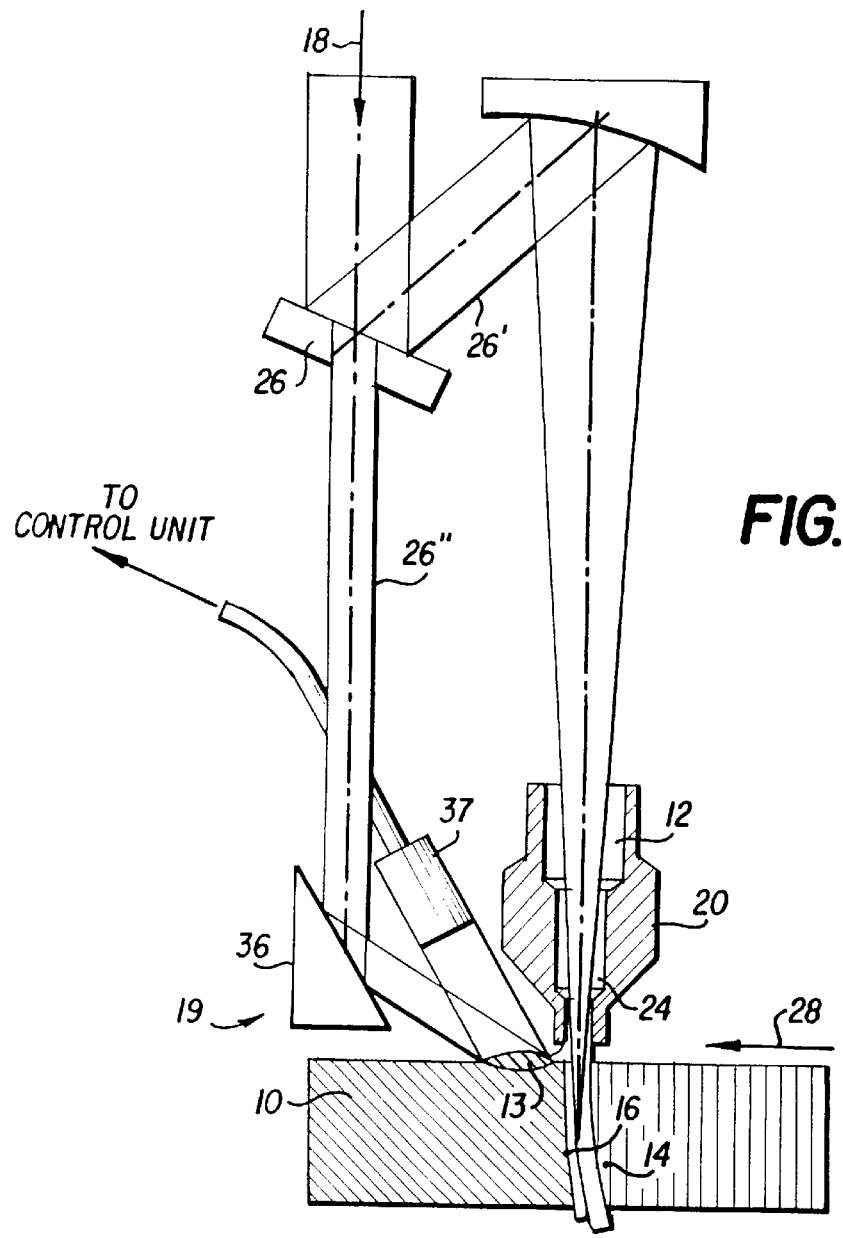
FIG. 5 shows a device with supervision of a preheating section.

FIG. 1 shows a workpiece 10, viz. a metal sheet or plate having a thickness s. Between the workpiece 10 and a laser beam 23 a relative displacement takes place in direction 28. The laser beam 23 is arranged coaxially with a nozzle 20 for combustible gas by means of which combustible gas 12 is blown onto the surface 11 of the workpiece 10. The nozzle 20 for combustible gas or rather its hole 24 is divided into tapering steps towards the workpiece 10 and has a narrowest nozzle step 20' whose hole diameter $s_d$ is shown in FIG. 2. This hole diameter $s_d$ is very small in comparison with the length of the hole 24. The ratio of the length 25 of the hole to the hole diameter $s_d$ is at least 8:1 so that the largest possible length of throw of the nozzle 20 for the combustible gas 12 is obtained. With such a large length of throw, the combustible gas 12 is blown out over a comparatively large distance without any essential expansion of the jet, and this is advantageous with regard to a narrow cut recess 14. The cut recess 14, which is cut as a kerf during the cutting process, is vertically hatched in FIGS. 1 to 5. The transition from the cut recess 14 to the cross-hatched area of the material of the workpiece 10, which has not yet been machined, constitutes the removal front 16. At this removal front 16, the material is melted and burnt. The burnt material or rather its oxide is blown away by the jet of combustible gas.

The laser radiation 15 of the laser beam 23 is focussed by means of a focussing lens 29 having a focal length 30. The focus 22 is arranged in the narrowest nozzle step 20. The focussing is of such a nature and the hole 24 is divided into steps in such a way that the laser radiation will not touch the inner walls of the nozzle 20. Due to the fact that the focus 22 is arranged above the workpiece surface 11, the laser beam 23 will be expanded in a direction away from the nozzle and this expansion will have the effect that a certain percentage of the laser radiation will not be irradiated onto the removal front 16 in the cut recess 14, but will preheat the material in the area of a preheating section 13 located around the removal front.

The workpiece 10 is preheated such that the material of the preheated section 13 can be ignited by the combustible gas 12. The material then burns under oxidation whereupon it is blown away due to the pressure of the jet of combustible gas 12. This has the effect that the cut recess 14 deepens while forming the removal front 16, which is shown schematically. The combustible gas 12 used is e.g. oxygen. For steel materials and titanium, the use of oxygen with a purity of at least 99.5% proved to be useful. The combustible gas or a mixture of gases reacts exothermically with the material to be cut. The power thus released and the radiation power irradiated onto the removal front constitute together the removal power. This removal power melts the material, burns it and the combustion residues 31 are blown away by the jet of combustible gas 12.

Figure 7:
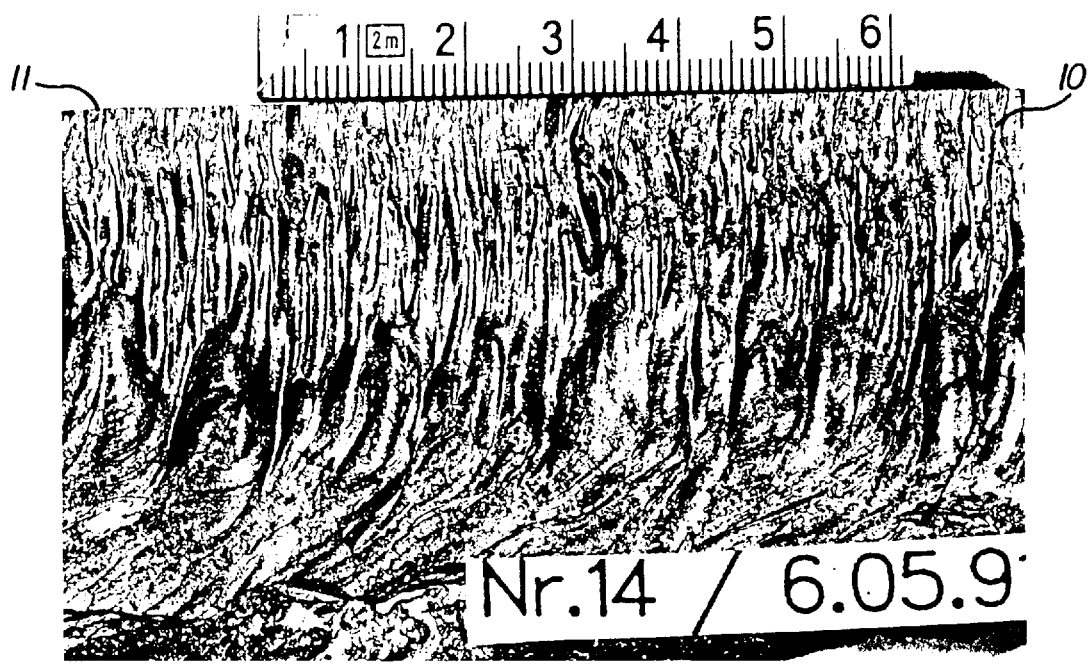
FIG. 7 shows a sectional view of a workpiece subjected to a conventional laser beam gas cutting process.
Figure 9:
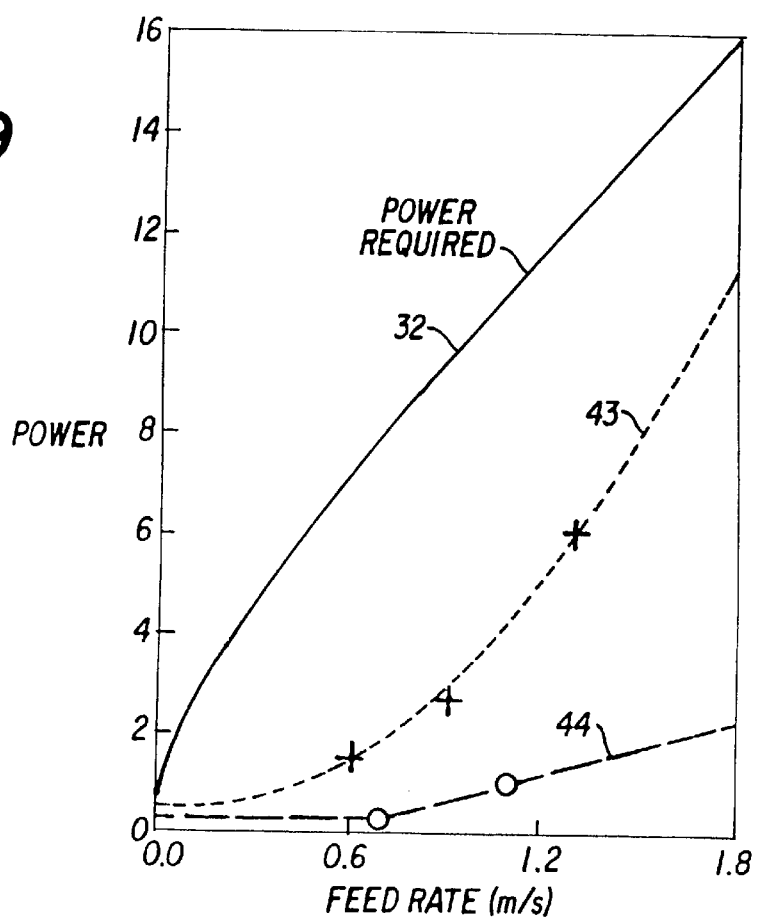
FIG. 9 shows a schematic representation of the dependence of the power on the feed rate for explaining the respective power percentages coupled in in a conventional laser beam gas cutting process and in a laser beam gas cutting process according to the present invention.

FIG. 9 shows the curve of the power 32, which is required for cutting a steel plate having a thickness of 20 mm, as a function of the feed rate. Curve 43 shows the laser power required in conventional laser gas cutting processes, i.e. when oxygen is blown onto the workpiece surface 11 and the laser radiation is coupled in without preheating the material to be cut. With increasing feed rates, the curve 43 representative of the necessary laser power rises very steeply, and this is equivalent to a decrease in the ratio of the power which can be coupled in by the reactive combustible gas jet to the laser power. From FIG. 7 it can also be seen that, when a steel plate having a thickness of 50 mm is cut in a conventional laser beam gas cutting process, the surface roughness will be substantial and that the cutting speed or rather the feed rate of the workpiece will be comparatively low.

Figure 8:
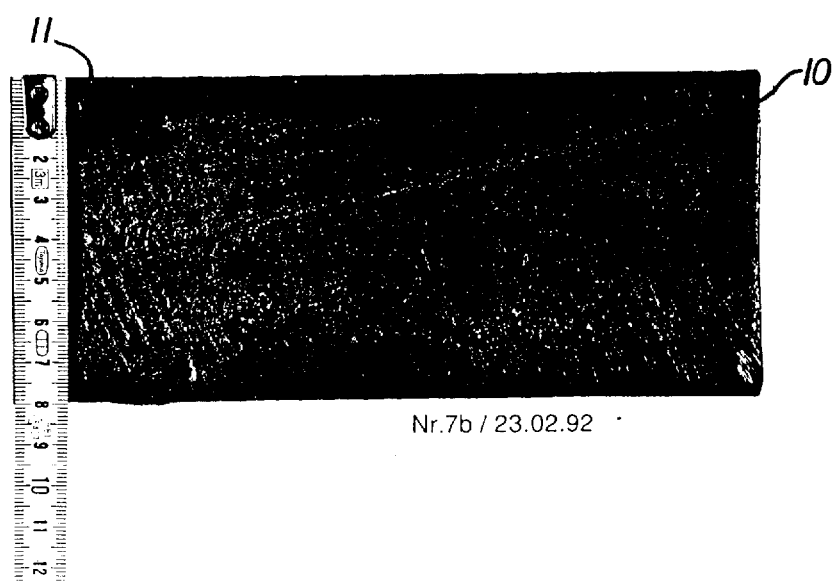
FIG. 8 shows a sectional view of a workpiece subjected to a laser beam gas cutting process according to the present invention.

According to FIG. 1, the preheating section 13 is preheated to a temperature below the melting temperature, said temperature being, however, equal to or higher than the ignition temperature. The preheating section is comparatively large so that the jet of combustible gas 12 will impinge on an ignitable surface of the material and burn said material. Due to the large size of the preheating section, it will be guaranteed that the cutting region is fully illuminated by the laser radiation, and this will prevent the removal front from leaving the region of the laser beam when an excessive iron-oxygen reaction takes place, which would have the effect that the cutting reaction terminates and this might cause burning out at the removal front and at the sidewalls of the cut recess, respectively. If, however, the removal of material is carried out with preheating with an ignition power of a few 100 W in the preheating section on the steel plate surface, an uninterrupted cutting operation will be maintained, and it turned out that the laser power which has to be coupled in via the removal front 16 for permitting high feed rates is comparatively low, cf. FIG. 9, curve 44. In addition, it can be seen from FIG. 8 that the surface quality is infinitely better.

Figure 11:
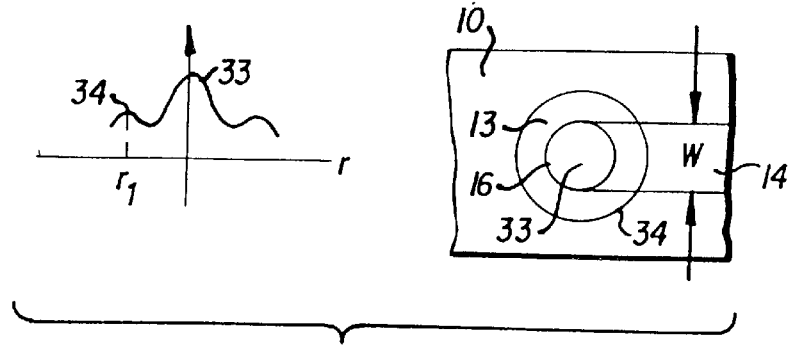
FIG. 11 shows a representation of an advantageous intensity distribution in the cross-section of a laser beam.

If a single laser beam 23 is used for acting on the removal front 16 as well as for carrying out the preheating, it may, due to the geometry of the laser beam 23, easily happen that an excessively large percentage thereof is used as preheating power. Hence, it will be very advantageous when the intensity distribution within the laser beam 23 can be influenced. This could especially be done in accordance with FIG. 11; in said FIG. 11, the laser beam 23 has a maximum 33 at the centre thereof, where r=0, said maximum 33 being surrounded by an annular secondary maximum 34, which is located in spaced relationship with said maximum 33 and which has the radius $r_1$. According to the representation on the right-hand side of FIG. 11, the diameter of the maximum 33 corresponds approximately to the width w of the cut recess so that the main percentage of the power of the laser beam 23 will be coupled in for removing material from the workpiece 10, whereas preheating of the preheating section 13 is achieved by the secondary maximum 34. In view of the fact that the energy distribution can easily be controlled by influencing the maximum 33 and the secondary maximum 34, respectively, an adequate control in response to the feed rate can be effected without any difficulties.

FIG. 2 shows an arrangement for removing material provided with a nozzle 20 for combustible gas, which is constructed and arranged in the manner shown in FIG. 1. Said nozzle 20 is, however, not used for passing laser radiation therethrough. On the contrary, a laser beam 23 is arranged such that its axis 23' is inclined relative to the longitudinal axis 20" of the nozzle 20 at an angle, said inclination being a forward inclination in the direction of the relative feed direction 28. Focussing by the lens 29 is effected in such a way that the focus 22 is arranged above the workpiece surface 11 and that laser radiation 17 impinges on a preheating section 13 located in front of the removal front 16 when seen in the relative feed direction 28. The preheating section 13 is preheated to at least the ignition temperature. The inclination of the laser beam 23 causes an elliptical beam spot. This beam spot projects beyond the upper end of the removal front 16 so that, consequently, part of the laser radiation 15 may be irradiated into the cut recess 14 and, when the removal front 16 extends at an oblique angle, also onto said removal front. This can reliably be prevented when the beam spot of the radiation 15 and the jet spot of the combustible gas 12 do not overlap. In this case the laser beam 23 will only cause preheating of the preheating section 13. The development of the removal process can also be influenced by the relative position of the laser beam spot and of the combustible gas jet spot. The use of laser radiation outside of the hole 24 of the nozzle 20 for the combustible gas provides the possibility of adapting the nozzle 20 as well as the laser radiation 15 separately to the removal process in the best possible way.

An optimum adaptation of the nozzle 20 for the combustible gas will be achieved when the nozzle diameter $s_d$ has the following dimensions:

$$\log\left[\frac{s_d}{[mm]}\right] = 6 \cdot \frac{s}{[mm]} + b$$

$s_d$=nozzle diameter
s=thickness of the steel plate
b=empirical value (−0.4<b<0.1).

Figure 10:
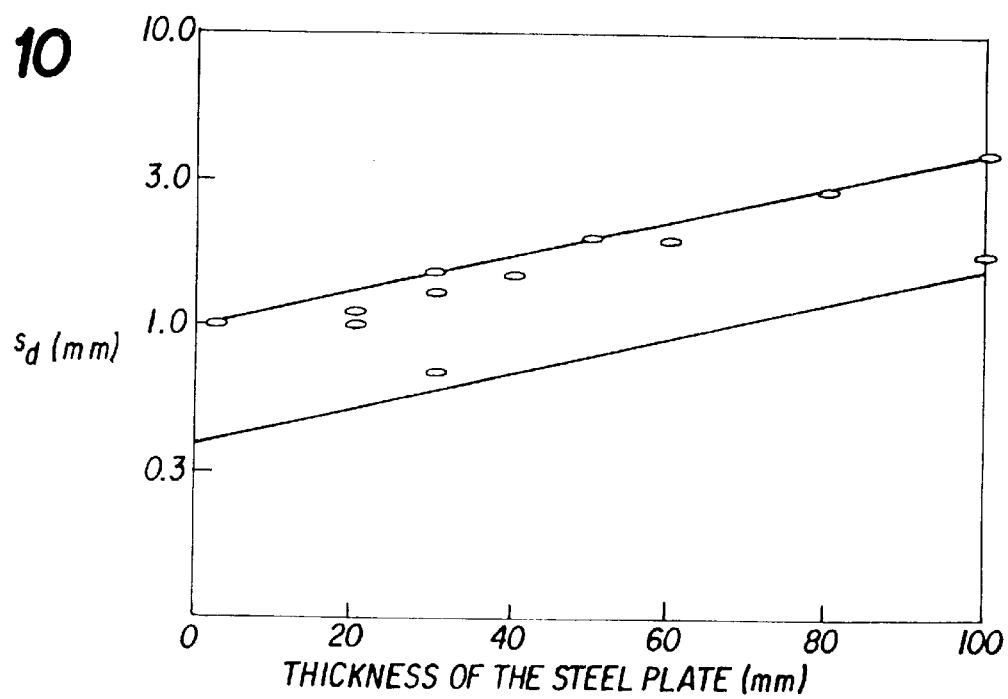
FIG. 10 shows a schematic representation of the dependence of the smallest diameter $s_d$ of the combustible gas nozzle on the plate thickness s.

This dimensioning is made clear by the representation shown in FIG. 10. The variation range of parameter b is due to the fact that the nozzle diameter $s_d$ may decrease when the gas pressure increases. The smallest nozzle diameters can be realized with supersonic nozzles.

FIGS. 3 to 5 show how an apparatus for removing material can be constructed in the best possible way when the preheating section 13 is preheated by a specially guided laser beam. According to FIG. 3, the laser radiation 18' of a radiation source 18, which is not shown, is supplied to a beam splitter 26, which is a component part of a means 19 for preheating the surface 11 of the workpiece 10. The beam splitter 26 is a reflecting mirror provided with a hole, a first, larger component 26' being reflected to a focussing mirror 35, which will focus this component of the radiation as a laser beam 23 through the nozzle 20 into the cut recess 14. The stepped structural design of the nozzle 20 is also advantageous in the case of this configuration of the laser beam 23 where the focus of the laser beam lies within the cut recess. A second radiation component 26" falls through the hole of the beam splitter 26 onto a focussing mirror 36 from which the preheating section 13 is exposed to radiation.

FIG. 4 shows the focussing of a laser beam 23 by a focussing lens 29 through a stepped hole 24 of a combustible gas nozzle 20 into the cut recess 14. Preheating of the preheating section 13 is carried out by a separate laser beam which is guided via a plurality of optical fibres 27 of a means 19 to the area of removal. The optical fibres 27 end in the vicinity of the workpiece surface 11 at the location at which they are intended to produce the preheating effect. In accordance with the structural requirements of the laser head, the optical fibres 27 can be arranged around the cutting gas nozzle 20. The heating geometry achieved by them corresponds practically to that of an annular nozzle of the type which would be adapted to be used in the present case if the heating were effected by means of heating gas.

Figure 6:
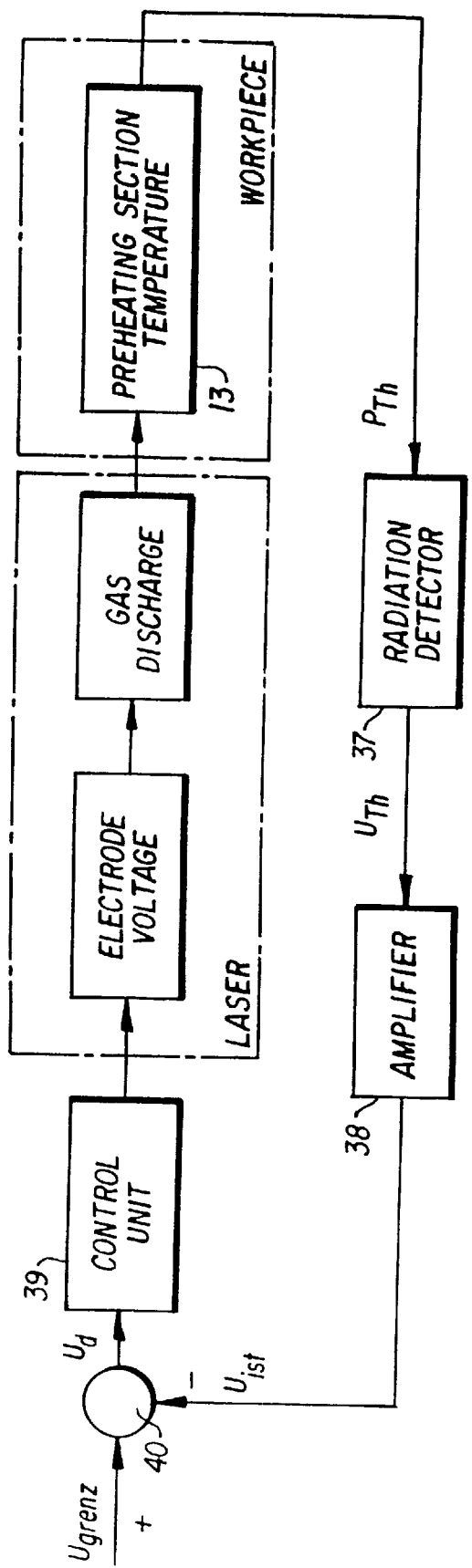
FIG. 6 shows a block diagram for controlling the temperature of the preheating section.

FIG. 5 shows an embodiment which is similar to that of FIG. 3 and which includes a radiation detector in the form of a photodiode 37. According to FIG. 6, said photodiode is connected to a control unit 39 via a comparator 40. The photodiode 37 receives thermal radiation from the preheating section 13 and produces a voltage $U_{Th}$ in accordance with the power $P_{Th}$ received, and the amplifier 38 will then supply an actual voltage $U_{ist}$ to the comparator 40 in correspondence with said voltage $U_{Th}$. This comparator has additionally applied thereto a voltage $U_{grenz}$ adapted to the ignition temperature of the preheating section 13, which is the minimum temperature which has to be reached. The difference between $U_{grenz}$ and $U_{ist}$ is supplied to the control unit 39 as differential voltage $U_d$, and the laser or rather the laser radiation source 18 will then be acted upon correspondingly by said control unit 39. In the example shown, the gas discharge is influenced by the electrode voltage of the laser so that the consequently emitted light or laser radiation will increase or reduce the temperature of the preheating section 13 or maintain said temperature constant.

We claim:

1. A method for removing material from a metal workpiece moved relative to a removal tool, comprising the step of preheating, without melting, a surface of the workpiece to a temperature at which ignition of the workpiece to burn workpiece material is triggered by a combustible gas which is blown onto a preheated section as a jet under pressure and by means of which burnt material of the workpiece is blown away from a cut recess produced by such burning, wherein in addition to the combustible gas, also laser radiation is irradiated into the cut recess where it impinges on a removal front, said laser radiation being in the form of a laser beam having an intensity distribution with a first maximum at the center thereof and an annular secondary maximum disposed around the first maximum.

2. A method according to claim 1, wherein the preheating section is preheated by means of laser radiation.

3. A method according to claim 2, wherein laser radiation originating from a laser radiation source is used for preheating the workpiece and for irradiation into the cut recess.

4. A method according to claim 1, wherein the temperature of a preheating section is controlled such that it is adjusted to at least an ignition temperature of the material.

5. A method according to claim 4, wherein the temperature of the preheating section is maintained constant.

6. A method according to claim 1, wherein the laser radiation irradiated into the cut recess is irradiated in the form of pulses.

7. A method according to claim 1, wherein the laser beam for laser radiation irradiated into the cut recess in addition to the combustible gas is adapted to be reduced or switched off.

8. An apparatus for removing material from a metal workpiece moved relative to a removal tool, comprising means for preheating a surface of the workpiece to a temperature below a melting temperature of the workpiece at which ignition of the workpiece to burn workpiece material is triggered by a combustible gas, and further comprising a nozzle for the combustible gas used for blowing said combustible gas under pressure onto a preheated section, wherein a laser is provided which produces a laser beam which, in addition to the combustible gas, impinges on a removal front of a cut recess, said laser beam having an intensity distribution with a first maximum at the center thereof and an annular secondary maximum disposed around the first maximum.

9. An apparatus according to claim 8, wherein a focus of the laser beam is arranged above the workpiece.

10. An apparatus according to claim 8, wherein the laser beam passes through the nozzle for the combustible gas.

11. An apparatus according to claim 8, wherein a nozzle for the combustible gas is a gas cutting nozzle tapering in steps towards the workpiece, and a focus of the laser beam is arranged in a narrowest nozzle step.

12. An apparatus according to claim 8, wherein a smallest diameter $(s_d)$ of the nozzle is smaller than a preheating section.

13. An apparatus according to claim 8, wherein a nozzle diameter $(s_d)$ is dimensioned as follows:

$$\log \left[ \frac{s_d}{[mm]} \right] = 6 \cdot \frac{s}{[mm]} + b$$

where $s_d$=nozzle diameter;

s=thickness of the workpiece; and b=empirical value ($-0.4 < b < 0.1$).

14. An apparatus according to claim 8, wherein a laser beam used for preheating is arranged such that it runs ahead of the nozzle and that it extends at an acute angle ($\alpha$) relative to a longitudinal axis of said nozzle.

15. The apparatus of claim 8, wherein the diameter of the first maximum corresponds approximately to the width of the cut recess.

16. The apparatus of claim 8, wherein an energy distribution of the laser beam between the first maximum and the secondary maximum is adjusted in accordance with a desired feed rate.

* * * * *

UNITED STATES PATENT AND TRADEMARK OFFICE
CERTIFICATE OF CORRECTION

PATENT NO. : 5,847,358
DATED : Dec. 8, 1998
INVENTOR(S) : Jörg Franke, Wolfgang Schulz and Gerd Herziger It is certified that error appears in the above-identified patent and that said Letters Patent is hereby corrected as shown below:

Column 9, line 43 (claim 8), change "bum" to --burn--.

Signed and Sealed this

Second Day of May, 2000

Attest:

Q. TODD DICKINSON

*Attesting Officer*  *Director of Patents and Trademarks*